(12) United States Patent
Chiken

(10) Patent No.: US 9,753,891 B2
(45) Date of Patent: Sep. 5, 2017

(54) FIELD DEVICE

(71) Applicant: YOKOGAWA ELECTRIC CORPORATION, Musashino-shi, Tokyo (JP)

(72) Inventor: Yoshihiro Chiken, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 251 days.

(21) Appl. No.: 14/503,777

(22) Filed: Oct. 1, 2014

(65) Prior Publication Data

US 2015/0095386 A1    Apr. 2, 2015

(30) Foreign Application Priority Data

Oct. 2, 2013  (JP) ................................ 2013-207537

(51) Int. Cl.
| | |
|---|---|
| G06F 11/14 | (2006.01) |
| G06F 17/10 | (2006.01) |
| G01F 1/84 | (2006.01) |
| G05B 19/042 | (2006.01) |

(52) U.S. Cl.
CPC ............ G06F 17/10 (2013.01); G01F 1/8436 (2013.01); G05B 19/0428 (2013.01); *G05B 2219/24043* (2013.01)

(58) Field of Classification Search
None
See application file for complete search history.

(56) References Cited

U.S. PATENT DOCUMENTS

| | | | | |
|---|---|---|---|---|
| 3,660,646 A | * | 5/1972 | Minero | ............... G06F 11/1641 |
| | | | | 708/533 |
| 4,314,350 A | * | 2/1982 | Toy | ..................... G06F 11/1497 |
| | | | | 708/533 |
| 4,361,877 A | | 11/1982 | Dyer et al. | |

(Continued)

FOREIGN PATENT DOCUMENTS

| | | |
|---|---|---|
| EP | 1857936 B1 | 4/2013 |
| JP | 08-029229 A | 2/1996 |

(Continued)

OTHER PUBLICATIONS

Communication issued Feb. 4, 2015 by the European Patent Office in related application 14187566.6.

*Primary Examiner* — David H Malzahn
(74) *Attorney, Agent, or Firm* — Sughrue Mion, PLLC

(57) ABSTRACT

A field device includes a first program area storing a first program, a second program area storing a second program designed such that if a program execution portion executes each of the first and second programs using the same data, a result of a calculation performed according to the second program is the same as a result of a calculation performed according to the first program, a first calculation result storage buffer storing a result of the calculation performed by the program execution portion according to the first program, and a second calculation result storage buffer storing a result of the calculation performed by the program execution portion according to the second program, and a calculation result comparator comparing the calculation result stored in the first calculation result storage buffer with the calculation result stored in the second calculation result storage buffer.

6 Claims, 9 Drawing Sheets

(56) References Cited

U.S. PATENT DOCUMENTS

| | | | | |
|---|---|---|---|---|
| 4,994,993 | A * | 2/1991 | Asghar | G06F 11/1497 708/533 |
| 5,181,206 | A * | 1/1993 | Hashiguchi | G06F 11/1004 714/722 |
| 5,578,764 | A | 11/1996 | Yokoi et al. | |
| 7,921,331 | B2 * | 4/2011 | Bose | G06F 11/1497 714/15 |
| 8,549,389 | B2 * | 10/2013 | Martin | G06F 11/1641 714/733 |
| 2005/0237232 | A1 | 10/2005 | Yoshino et al. | |
| 2006/0044157 | A1 | 3/2006 | Peters et al. | |
| 2012/0155641 | A1 * | 6/2012 | Vaikuntanathan | H04L 9/00 380/255 |
| 2015/0095386 | A1 * | 4/2015 | Chiken | G01F 1/8436 708/200 |
| 2015/0205652 | A1 * | 7/2015 | Noguchi | G06F 11/0727 714/819 |

FOREIGN PATENT DOCUMENTS

| | | |
|---|---|---|
| JP | 2005-309913 A | 11/2005 |
| JP | 2006-209523 A | 8/2006 |
| JP | 2011-187028 A | 9/2011 |

* cited by examiner

FIELD DEVICE

CROSS-REFERENCE TO RELATED APPLICATION(S)

The present application claims the benefit of priority of Japanese Patent Application No. 2013-207537 filed on Oct. 2, 2013. The disclosures of the application are incorporated herein by reference.

BACKGROUND

Technical Field

The present disclosure relates to a field device and, more particularly, to a field device that performs calculations using detected values and that outputs calculation results as measurement results.

Some field devices such as transmitters perform complex calculations using detected values and output calculation results as measurement results. For example, a Coriolis flowmeter vibrates a tube in which a fluid to be measured flows. Then, the Coriolis flowmeter detects the displacement of each of the upstream-side and the downstream-side of the tube, and the resistance value of a resistance temperature detector (RTD) placed near the tube. The Coriolis flowmeter performs predetermined calculations including high-order filtering processing and polynomial approximation processing, using detected displacements. Thus, the Coriolis flowmeter calculates the phase difference between upstream-side and downstream-side displacement signals and the frequency of the vibration of the tube, and also calculates the resistance value of the resistance temperature detector. Based on the values calculated, the Coriolis flowmeter calculates the flow rate, the temperature, and the density of the fluid to be measured.

FIG. 8 is a block diagram illustrating the configuration of a related-art Coriolis flowmeter. As illustrated in this figure, the Coriolis flowmeter 300 has a detection portion 310 and a conversion portion 320.

The detection portion 310 has an upstream-side coil 311, a downstream-side coil 312, a drive coil 313, and a resistance temperature detector 314.

The conversion portion 320 has an input amplifier 321 amplifying a displacement signal output by the upstream-side coil 311, an input amplifier 322 amplifying a displacement signal output by the downstream-side coil 312, an RTD drive circuit 324 driving the resistance temperature detector 314, a drive circuit 323 driving the drive coil 313, an analog-to-digital converter (ADC) 325 digitally converting amplified upstream-side and downstream-side displacement signals, and an output signal from the resistance temperature detector 314, a signal processing circuit 326, a processor 327, an output circuit 328 outputting a result of a calculation by the processor 327 as a measurement result, and a display unit 329 displaying a result of a calculation by the processor 327 as a measurement result.

The signal processing circuit 326 has a core portion 340, and a program storage memory 350. FIG. 9 is a diagram schematically illustrating a storage area formed in the program storage memory 350. As illustrated in this figure, a digital data buffer area 351, a signal processing program area 352, a signal processing program buffer area 353, and a calculation result storage buffer area 354 are formed in the program storage memory 350.

The digital data buffer area 351 temporarily stores digital data represented by upstream-side and downstream-side displacement signals amplified and digital data represented by an output signal of the resistance temperature detector 314, which are output by the ADC 325.

The signal processing program area 352 stores signal processing programs to be executed by the core portion 340. Signal processing performed by the core portion 340 includes digital filter processing, polynomial approximation processing, four arithmetic calculations, and trigonometric function calculations. The core portion 340 executes signal processing programs sored in the signal processing program area 352. Thus, based on digital data stored in the digital data buffer area 351, the core portion 340 calculates the minute phase difference between the upstream-side and downstream-side displacement signals, the frequency of the vibration of the tube, and the resistance value of the resistance temperature detector 314.

The signal processing program buffer area 353 is an area in which the core portion 340 executing the signal processing programs temporarily stores values obtained halfway of the calculation. The values obtained halfway of the calculation includes intermediate data obtained halfway of the digital filter processing and the like.

The calculation result storage buffer area 354 is an area in which the core portion 340 stores the phase difference, the frequency of the vibration and the resistance value obtained as calculation results.

Turning back to the description of FIG. 8, the processor 327 calculates the flow rate, the temperature, and the density of the fluid to be measured, based on the phase difference, the frequency of the vibration and the resistance value stored in the calculation result storage buffer area 354. Then, the processor 327 outputs the calculated flow rate, temperature, and density to the output circuit 328 and the display unit 329 as measurement results.

PRIOR ART DOCUMENT

Patent Document

[Patent Document 1] JP-A-2005-309913
[Patent Document 2] JP-A-8-29229

The field devices are sometimes required from the viewpoint of the reliability and the functional safety of the system to check the soundness of the memory during an operation. Checking the soundness of the memory is, e.g., to check whether a value is normally read and written from and to each area formed in the program storage memory 350.

If the memory is the signal processing program area 352, program codes are static. Therefore, even during an operation, the soundness of the memory can easily be checked utilizing an error detecting code, or the like.

However, in the case of the program buffer area 353 or the calculation result storage buffer area 354, in which the values obtained halfway of the calculation or the results of the calculation are temporarily stored, the values to be stored may change during an operation. Thus, it is not easy to check the soundness of the memory.

SUMMARY

Exemplary embodiments of the invention provides a field device that performs calculations using detected values and that outputs calculation results as measurement results, in which soundness of a memory in the case of a memory area in which a value dynamically changes can be checked during an operation.

A field device according to a first aspect of the invention, comprises:

a program execution portion configured to perform a calculation using a detected value;

a memory comprising a data buffer area configured to store data based on the detected value, a first program area configured to store a first program causing the program execution portion to perform a calculation using the data, a second program area configured to store a second program causing the program execution portion to perform a calculation using the data, the second program designed such that if same data is used for the calculation, a result of the calculation performed according to the second program is the same as a result of the calculation performed according to the first program, a first program buffer area configured to store intermediate data when the program execution portion executes the first program, a second program buffer area configured to store intermediate data when the program execution portion executes the second program, a first calculation result storage buffer configured to store a result of the calculation performed by the program execution portion according to the first program, and a second calculation result storage buffer configured to store a result of the calculation performed by the program execution portion according to the second program; and a calculation result comparator configured to compare the calculation result stored in the first calculation result storage buffer with the calculation result stored in the second calculation result storage buffer.

A field device according to a second aspect of the invention, comprises:

a program execution portion configured to perform a calculation using a detected value;

a memory comprising a first data buffer area configured to store data based on the detected value, a second data buffer area configured to store the data based on the detected value, a first program area configured to store a first program causing the program execution portion to perform a calculation using the data stored in the first data buffer area, a second program area configured to store a second program causing the program execution portion to perform a calculation using the data stored in the second data buffer, the second program designed such that if same data is used for the calculation, a result of the calculation performed according to the second program is the same as a result of the calculation performed according to the first program, a first program buffer area configured to store intermediate data when the program execution portion executes the first program, a second program buffer area configured to store intermediate data when the program execution portion executes the second program, a first calculation result storage buffer configured to store a result of the calculation performed by the program execution portion according to the first program, and a second calculation result storage buffer configured to store a result of the calculation performed by the program execution portion according to the second program; and a calculation result comparator configured to compare the calculation result stored in the first calculation result storage buffer with the calculation result stored in the second calculation result storage buffer.

A field device according to a third aspect of the invention, comprises:

a program execution portion configured to perform a calculation using a detected value;

a memory comprising a data buffer area configured to store data based on the detected value, a program area configured to store a program causing the program execution portion to repeatedly perform a calculation twice using the data, a first program buffer area configured to store intermediate data when the program execution portion executes the program a first time, a second program buffer area configured to store intermediate data when the program execution portion executes the program a second time, a first calculation result storage buffer configured to store a result of the calculation performed by the program execution portion the first time according to the program, and a second calculation result storage buffer configured to store a result of the calculation performed by the program execution portion the second time according to the program; and a calculation result comparator configured to compare the calculation result stored in the first calculation result storage buffer with the calculation result stored in the second calculation result storage buffer.

According to the invention, in a field device that performs calculations using detected values and that outputs calculation results as measurement results, the soundness of a memory in the case of a memory area in which a value dynamically changes can be checked during an operation.

DETAILED DESCRIPTION

Figure 1:
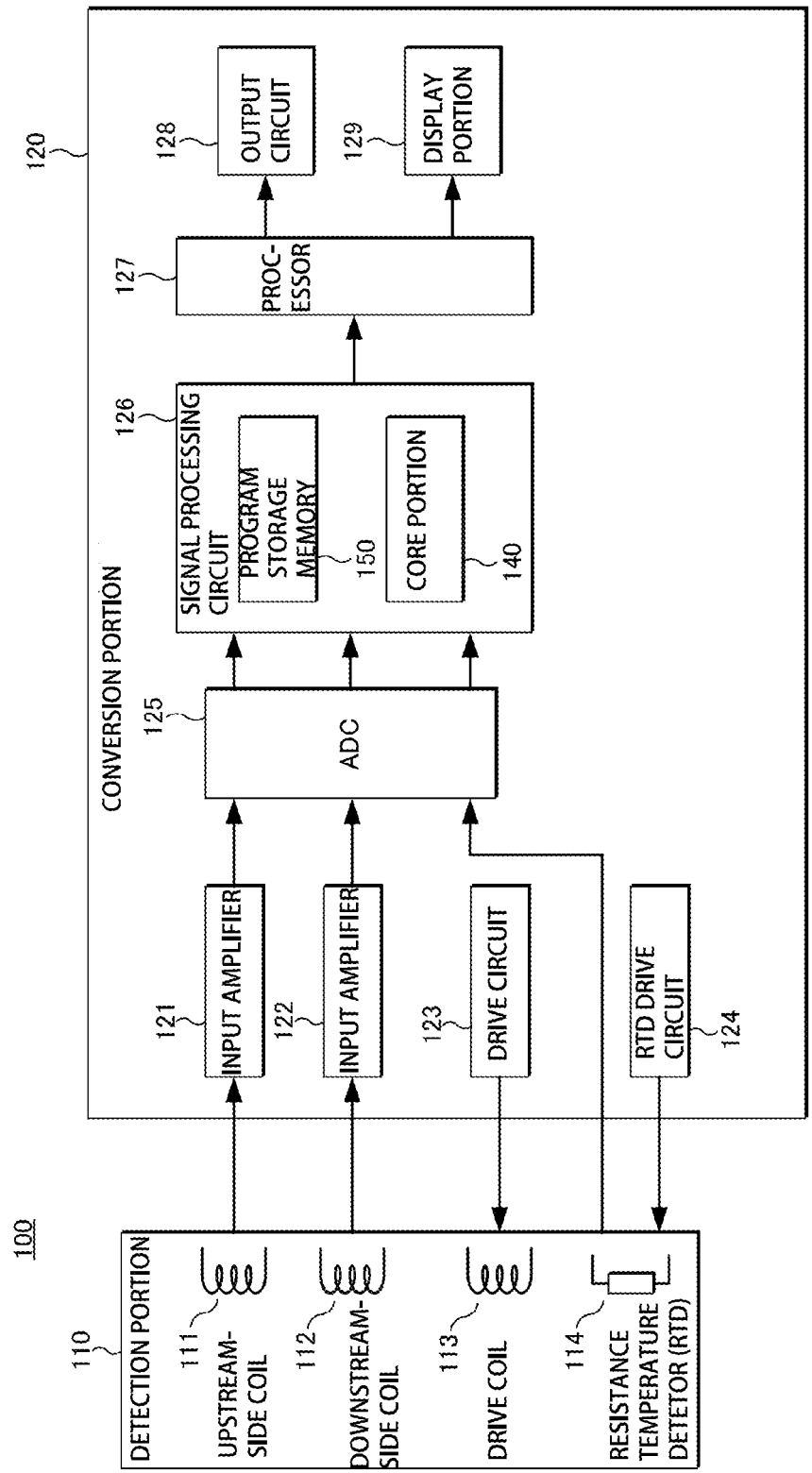
FIG. 1 is a block diagram illustrating a configuration of the Coriolis flowmeter according to this embodiment.

An embodiment of the embodiment is described hereinafter with reference to the accompanying-drawings. FIG. 1 illustrates a case where a field device according to the invention is applied to a Coriolis flowmeter. Incidentally, the invention can be applied not only to the Coriolis flowmeter but to various field devices that perform calculations using detected values and that output calculation results as measurement results.

FIG. 1 is a block diagram illustrating the configuration of the Coriolis flowmeter according to this embodiment. As illustrated in this figure, the Coriolis flowmeter 100 includes a detection portion 110 and a conversion portion 120.

The detection portion 110 includes an upstream-side coil 111 detecting the upstream-side displacement of a tube that flows a fluid to be measured, a downstream-side coil 112 detecting the downstream-side displacement thereof, a drive coil 113 vibrating the tube at the natural frequency of the tube, and a resistance temperature detector (RTD) 114.

The conversion portion 120 includes an input amplifier 121 amplifying a displacement signal output by the upstream-side coil 111, an input amplifier 122 amplifying a displacement signal output by the downstream-side coil 112, a drive circuit 123 driving the drive coil 113, an RTD drive circuit 124 driving the resistance temperature detector 114, an ADC 125 digitally converting amplified upstream-side and downstream-side displacement signals and output signals of the resistance temperature detector 114, a signal processing circuit 126, a processor 127, an output circuit 128 outputting results of a calculation performed by the processor 127 as a measurement result to the outside thereof, and a display unit 129 displaying a result of the calculation performed by the processor 127 as a measurement result.

The signal processing circuit 126 calculates the minute phase difference between signals respectively representing displacements of the upstream-side and downstream-side of the tube, the frequency of the vibration of the tube, and the resistance value of the resistance temperature detector 114, based on digital data represented by upstream-side and downstream-side displacement signals amplified and digital data represented by an output signal from the resistance temperature detector 114, which are output by the ADC 125.

The processor 127 calculates, based on the phase difference, the frequency of the vibration, and the resistance value which are results of a calculation performed by the signal processing circuit 126, the flow rate, the temperature, and the density of a fluid to be measured, and outputs results of the calculation as measurement results to the output circuit 128 and the display unit 129.

Figure 2:
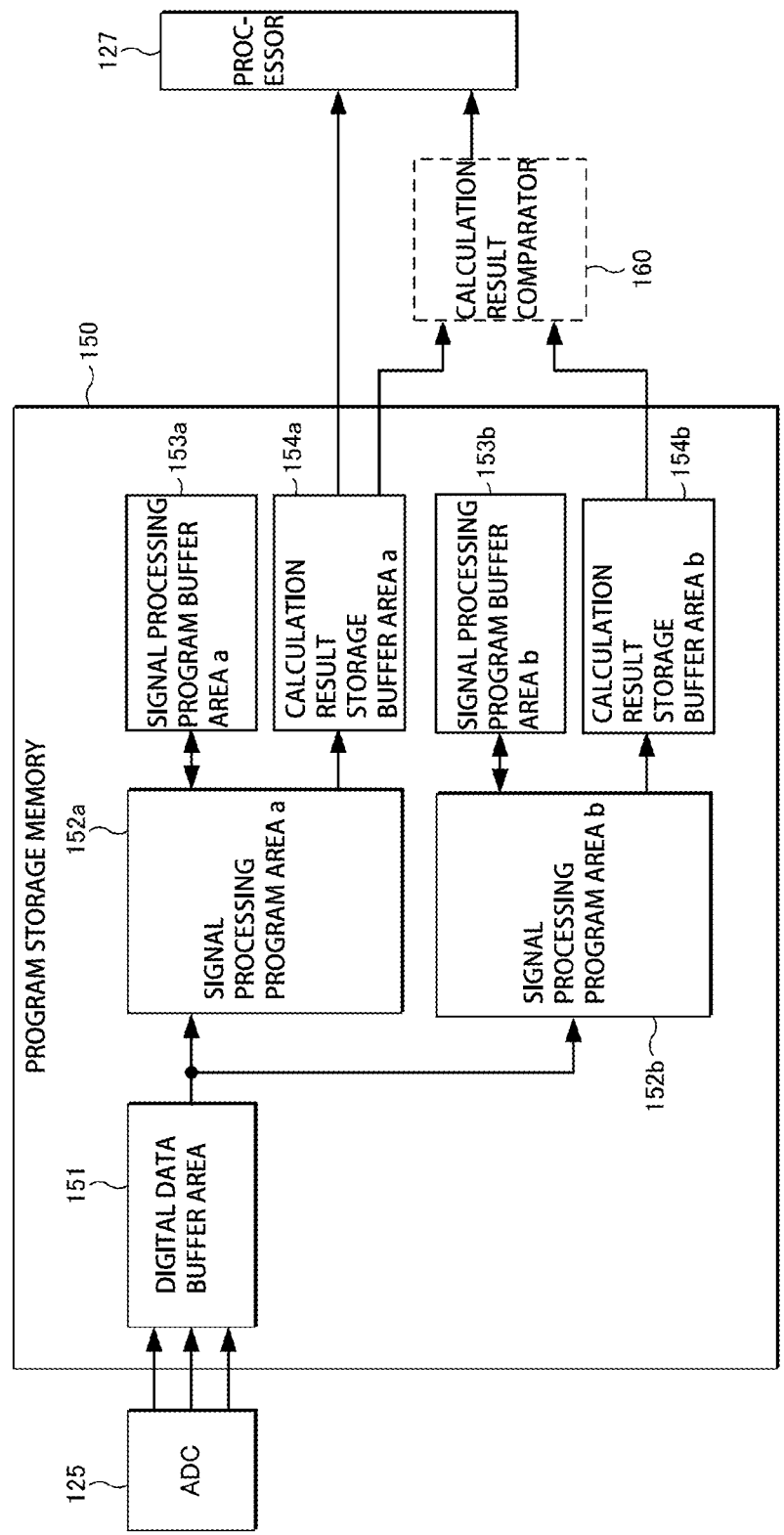
FIG. 2 schematically illustrates storage areas formed in a program storage memory.

The signal processing circuit 126 includes a core portion 140 functioning as a program execution portion, and a program storage memory 150. FIG. 2 schematically illustrates storage areas formed in the program storage memory 150. As illustrated in this figure, a digital data buffer area 151, a signal processing program area a 152a, a signal processing program area b 152b, a signal processing program buffer area a 153a, a signal processing program buffer area b 153b, a calculation result storage buffer area a 154a, and a calculation result storage buffer area b 154b are formed in the program storage memory 150.

The digital data buffer area 151 temporarily stores digital data represented by upstream-side and downstream-side displacement signals amplified and digital data represented by output signals of the resistance temperature detector 114, which are output by the ADC 125.

The signal processing program area a 152a stores a signal processing program a to be executed by the core portion 140. The signal processing program area b 152b stores a signal processing program executed b by the core portion 140. The signal processing program a and the signal processing program area b are assumed to obtain same results for same input data. That is, the signal processing program b is designed such that if same data is input to the signal processing programs a and b, the signal processing programs b outputs the same calculation result as the calculation result output by the signal processing program a. As long as this condition is satisfied, both of the signal processing programs a, and b may be either the same program or different programs.

The signal processing program buffer area a 153a is an area in which, while the core portion 140 executes the signal processing program a, values calculated halfway of the calculation are temporarily stored. The signal processing program buffer area b 153b is an area in which, while the core portion 140 executes the signal processing program b, values calculated halfway of this calculation are temporarily stored.

The calculation result storage buffer area a 154a is an area in which, when the core portion 140 executes the signal processing program a, calculation results are stored. The calculation result storage buffer area b 154b is an area in which, when the core portion 140 executes the signal processing program b, calculation results are stored. According to this embodiment, calculation results stored in the calculation result storage buffer area a 154a are output to the processor 127. The calculation results stored in the calculation result storage buffer area b 154b are used for checking the soundness of the memory.

A calculation result comparator 160 determines whether the calculation result stored in the calculation result storage buffer area a 154a matches or mismatches the calculation result stored in the calculation result storage buffer area b 154b. Determination results are output to the processor 127. Incidentally, the calculation result comparator 160 is a block constructed in a software manner by operation of the core portion 140. However, the calculation result comparator 160 may be constructed by hardware.

According to this embodiment, the core portion 140 uses data stored in the digital data buffer area 151 and performs signal processing calculation using different programs, i.e., the signal processing programs a, and b. That is, the core portion 140 performs two signal processing calculations using same data.

At that time, when executing the signal processing program a, the core portion 140 perform a calculation using the signal processing program buffer area a 153a, and causes the calculation result storage buffer area a 154a to store a calculation result. On the other hand, when executing the signal processing program b, the core portion 140 perform a calculation using the signal processing program buffer area b 153b, and causes the calculation result storage buffer area b 154b to store a calculation result.

In the case of each of the signal processing program buffer area a 153a, the calculation result storage buffer area a 154a, the signal processing program buffer area b 153b, the calculation result storage buffer area b 154b a value stored therein dynamically changes during an operation. If there is an area from or to which data cannot normally be read or written, a calculation result stored in the calculation result storage buffer area a 154*a* mismatches a calculation result stored in the calculation result storage buffer area b 154*b*.

More specifically, for example, in a process of calculating a calculation result such as a phase difference, the signal processing program a temporarily writes intermediate data to the signal processing program buffer area a 153*a*. After that, the signal processing program a reads the intermediate data written thereto, if necessary. Then, a calculation is performed by the signal processing program a using the intermediate data to obtain a result. Thus, if data cannot normally be read or written from or to the signal processing program buffer area a 153*a*, an anomalous value is calculated as a calculation result. Consequently, a calculation result stored in the calculation result storage buffer area a 154*a* mismatches a calculation result stored in the calculation result storage buffer area b 154*b*. This is the same with a case where data cannot normally be read or written from or to the signal processing program buffer area b 153*b*.

Conversely, if a calculation result stored in the calculation result storage buffer area a 154*a* matches a calculation result stored in the calculation result storage buffer area b 154*b*, it is considered that the soundness of the memory is maintained.

Thus, the calculation result comparator 160 compares both of the calculation results, so that the memory-soundness of the memory area, in which the value of data stored therein dynamically changes during an operation of the memory area, can be checked.

Figure 3:
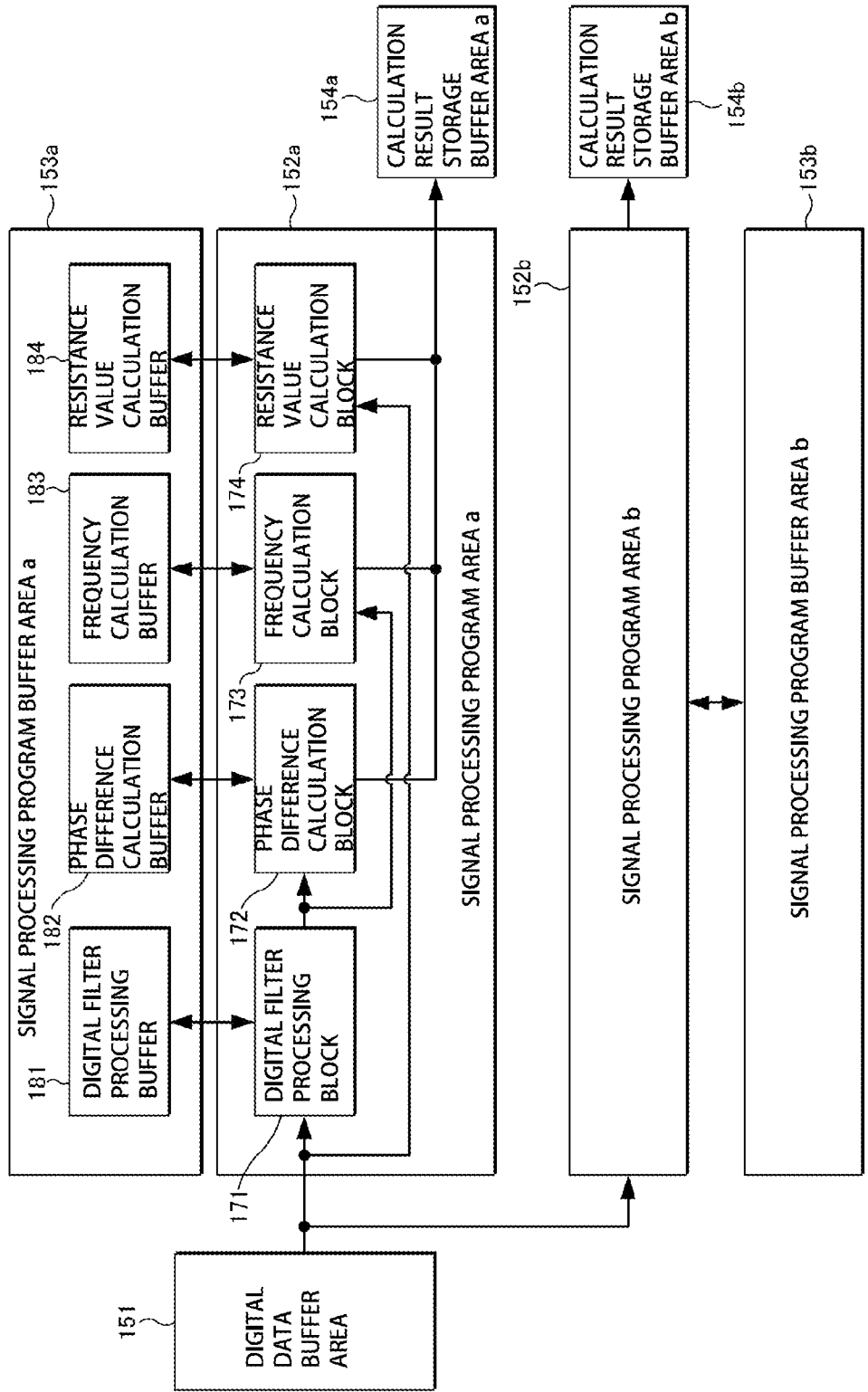
FIG. 3 is a diagram schematically illustrating a concrete configuration of each of a signal processing program area a and a signal processing program buffer area a according to this embodiment.

FIG. 3 schematically illustrates a concrete configuration of each of the signal processing program area a 152*a* and the signal processing program buffer area a 153*a* according to this embodiment obtained by applying the invention to a Coriolis flowmeter. As illustrated in this figure, a digital filtering processing block 171, a phase difference calculation block 172, a frequency calculation block 173, and a resistance value calculation block 174 are formed in the signal processing program area a 152*a*. A digital filtering processing buffer 181, a phase difference calculation buffer 182, a frequency calculation buffer 183, and a resistance value calculation buffer 184 are formed in the signal processing program buffer area a 153*a*.

The digital filtering processing block 171 performs digital filtering processing on digital data stored in the digital data buffer area 151, utilizing the digital filtering processing buffer 181. The phase difference calculation block 172 calculates the phase difference between the upstream-side and downstream-side displacement signals of the tube, utilizing the phase difference calculation buffer 182. The frequency calculation block 173 calculates the frequency of the vibration of the tube, utilizing the frequency calculation buffer 183. The resistance value calculation block 174 calculates the resistance value of the resistance temperature detector 114, utilizing the resistance value calculation buffer 184.

Incidentally, the signal processing program area b 152*b* and the signal processing program buffer area b 153*b* can be configured similarly to the signal processing program area a 152*a* and the signal processing program buffer area a 153*a*, respectively.

Figure 4:
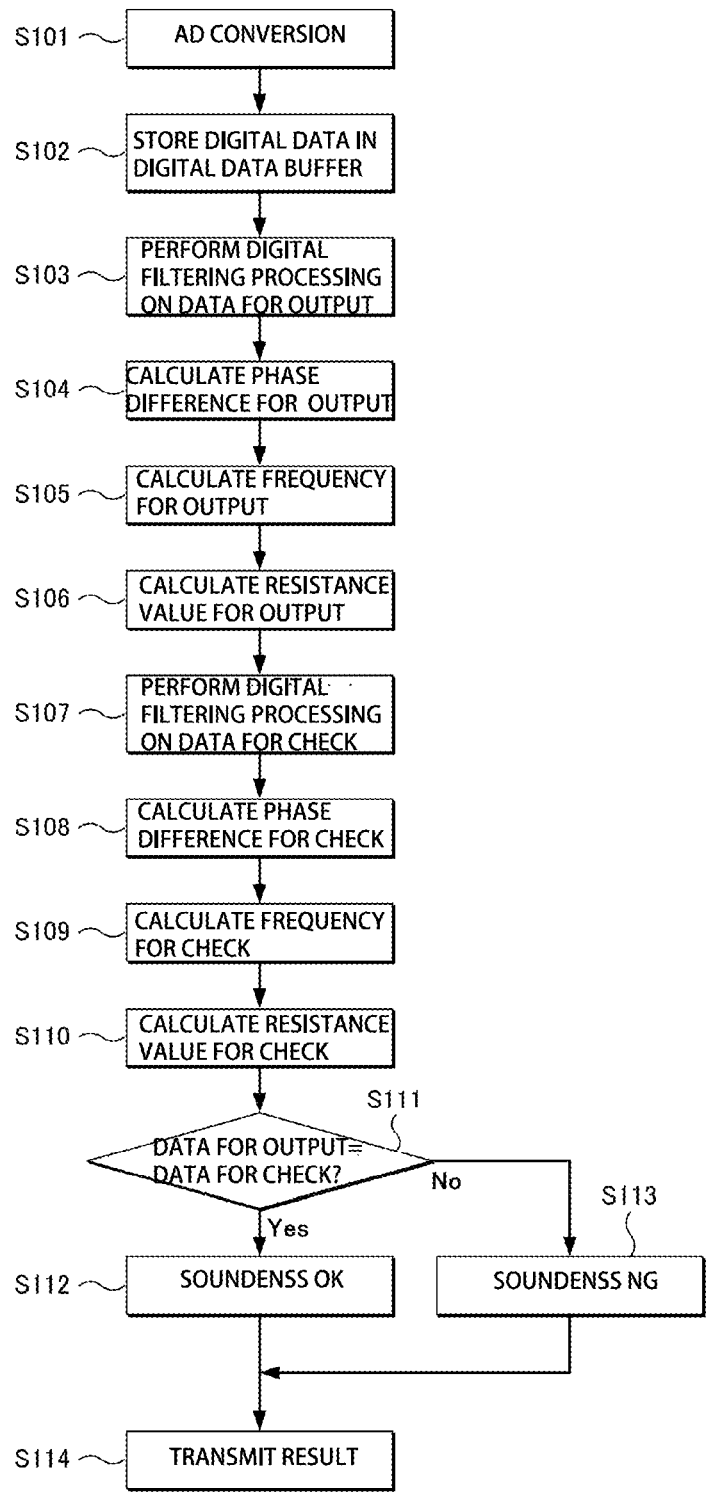
FIG. 4 is a flowchart illustrating an operation of a core portion of a signal processing circuit which executes a signal processing program.

FIG. 4 is a flowchart illustrating an operation performed while the core portion 140 of the signal processing circuit 126 of the above configuration executes a signal processing program. In step S101, the ADC 125 outputs digital data represented by upstream-side and downstream-side displacement signals, and digital data represented by output signals of the resistance temperature detector 114. Then, in step S102, the digital data output therefrom are stored in the digital data buffer area 151.

Next, in step S103, an operation according to the signal processing program a used for output ("for output" means for outputting its calculation results to the processor 127) is performed. Then, the digital filtering processing block 171 performs digital filtering processing on digital data represented by upstream-side and downstream-side displacement signals. In step S104, the phase difference calculation block 172 calculates the phase difference between the upstream-side and downstream-side displacement signals. In step S105, the frequency calculation block 173 calculates the frequency of the vibration of the tube. In step S106, the resistance value calculation block 174 calculates the resistance value of the resistance temperature detector 114 using digital data represented by output signals of the resistance temperature detector 114. Calculation results of these types of processing are stored in the calculation result storage buffer area a 154*a*.

Next, in step S107, an operation according to the signal processing program b used for check ("for check" means "for checking the soundness of the memory") is performed. The digital filtering processing block 171 performs digital filtering processing on digital data represented by the upstream-side and downstream-side displacement signals. In step S108, the phase difference calculation block 172 calculates the phase difference between the upstream-side and downstream-side displacement signals. In step S109, the frequency calculation block 173 calculates the frequency of the vibration of the tube. In step S110, the resistance value calculation block 174 calculates the resistance value of the resistance temperature detector 114 using digital data represented by output signals of the resistance temperature detector 114. Calculation results of these types of processing are stored in the calculation result storage buffer area b 154*b*.

Then, in step S111, the calculation result comparator 160 determines whether the calculation result stored in the calculation result storage buffer area a 154*a* matches the calculation result stored in the calculation result storage buffer area b 154*b*. If the former calculation result matches the latter calculation result, in step S112, the calculation result comparator 160 determines that the soundness of the memory is maintained. If the former calculation result mismatches the latter calculation result, in step S113, the calculation result comparator 160 determines that the soundness of the memory is not maintained.

In step S114, the calculation results stored in the calculation result storage buffer area a 154*a*, and the result of determination on the soundness of the memory are transmitted to the processor 127. If the soundness of the memory is maintained, the flow rate, the temperature, and the density of the fluid to be measured are calculated. If the soundness of the memory is not maintained, processing such as warning is performed.

If the soundness of the memory is not maintained, the program storage memory 150 may be cleared once. Alternatively, the signal processing program may be reloaded.

Incidentally, the above example is configured to send to the processor 127 the result of the calculation obtained by executing the signal processing program a. However, if the calculation result stored in the calculation result storage buffer area a 154*a* mismatches the calculation result stored in the calculation result storage buffer area b 154*b*, the core portion 140 may calculate a difference between the calculation result stored in the calculation result storage buffer area a 154*a* and a calculation result obtained by executing the signal processing program a at the last time at which the calculation result stored in the calculation result storage buffer area a 154*a* matches the calculation result stored in the calculation result storage buffer area b 154*b*. In addition, the core portion 140 may calculate a difference between the calculation result stored in the calculation result storage buffer area b 154*b* and a calculation result obtained by executing the signal processing program b at the last time at which the calculation result stored in the calculation result storage buffer area a 154*a* matches the calculation result stored in the calculation result storage buffer area b 154*b*. Then, between the calculation results respectively stored in the calculation result storage buffer area a 154*a* and the calculation result storage buffer area b 154*b*, the calculation result corresponding to one of the differences, which has a smaller absolute value, may be transmitted to the processor 127. This is because it is considered that large variation of calculation results respectively corresponding to consecutive measurements hardly occurs, and that a value closer to the value of the calculation result at the last time, at which the calculation results respectively stored in the calculation result storage buffer areas 154*a* and 154*b* match each other, is proper.

Figure 5:
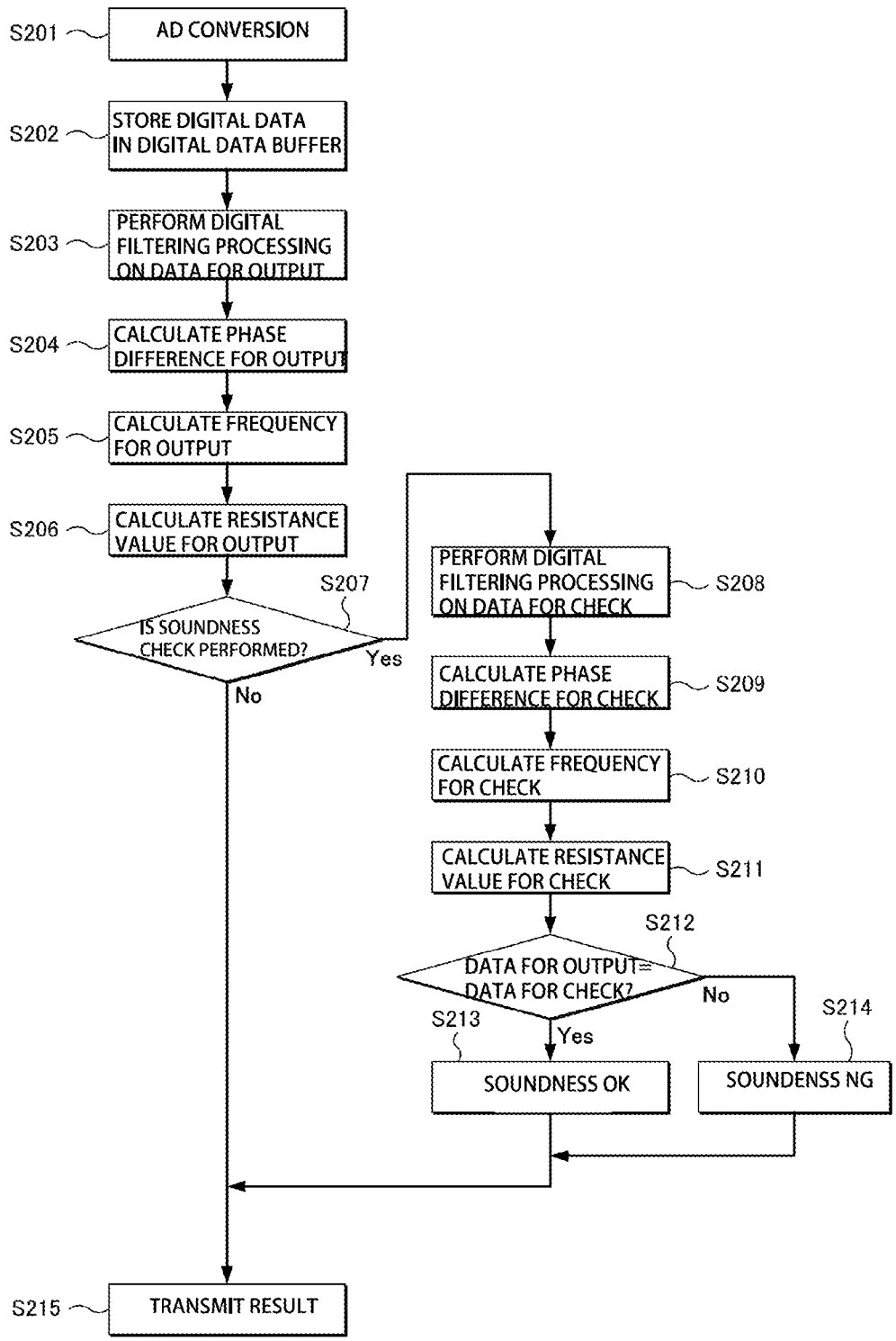
FIG. 5 is a flowchart illustrating an operation of the signal processing circuit in which the soundness of the memory is intermittently checked.

In addition, in the above example, the soundness of the memory is checked at each measurement. However, the soundness of the memory may intermittently be checked, as described in a flowchart illustrated in FIG. 5.

That is, if the ADC 125 outputs digital data in step S201 and the digital data is then stored in the digital data buffer area 151 in step S202, operations similar to those performed by the signal-processing program a used for output in steps S103 to S106 in FIG. 4 may be performed by the signal-processing program a in steps S203 to S206.

Next, in step S207, it may be determined whether the soundness of the memory is checked. It may preliminarily be determined that the soundness of the memory is checked every predetermined number of times of calculations or every predetermined time.

If the soundness of the memory is not checked as a result (No in step S207), the calculation result stored in the calculation result storage buffer area a 154*a* may be transmitted to the processor 127 in step S215.

On the other hand, if the soundness of the memory is checked (Yes in step S207), operations similar to those performed by the signal processing program b for used for check in steps S107 to S110 in FIG. 4 may be performed by the signal processing program b in steps S208 to S211. Then, in step S212, the calculation result comparator 160 may determine whether the calculation result stored in the calculation result storage buffer area a 154*a* matches the calculation result stored in the calculation result storage buffer area b 154*b*. If the former calculation result matches the latter calculation result, in step S213, it may be determined that the soundness of the memory is maintained. If the former calculation result mismatches the latter calculation result, in step S214, it may be determined that the soundness of the memory is not maintained.

Then, in step S215, the calculation result stored in the calculation result storage buffer area a 154*a* and a result of determination on the soundness of the memory may be transmitted to the processor 127.

Figure 6:
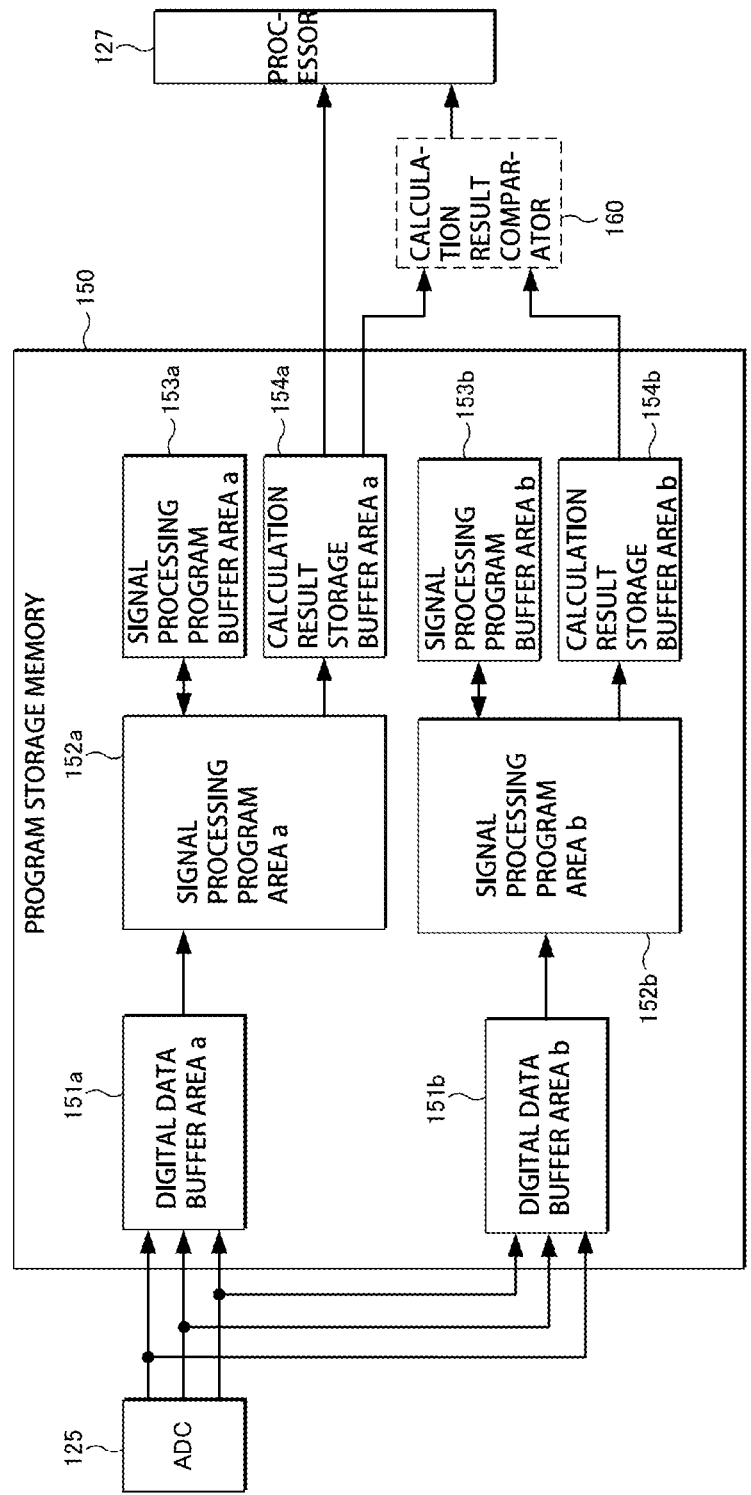
FIG. 6 is a diagram illustrating a first modified example of the embodiment.

Next, modified examples of this embodiment are described hereinafter. FIG. 6 is a diagram illustrating a first modified example. As illustrated in this figure, according to the first modified example, the digital data buffer area a 151*a*, the digital data buffer area b 151*b*, the signal processing program area a 152*a*, the signal processing program area b 152*b*, the signal processing program buffer area a 153*a*, the signal processing program buffer area b 153*b*, the calculation result storage buffer area a 154*a*, and the calculation result storage buffer area b 154*b* are formed in the program storage memory 150.

That is, the digital data buffer area 151 is divided into the area for output, and the area for check. Digital data output from the ADC 125 is stored in both of the digital data buffer area a 151*a* and the digital data buffer area b 151*b*.

The signal processing program a performs a calculation using digital data stored in the digital data buffer area a 151*a*. The signal processing program b performs a calculation using digital data stored in the digital data buffer area b 151*b*. According to this modified example, the soundness of each of the digital data buffer area a 151*a* and the digital data buffer area b 151*b* can be checked.

Figure 7:
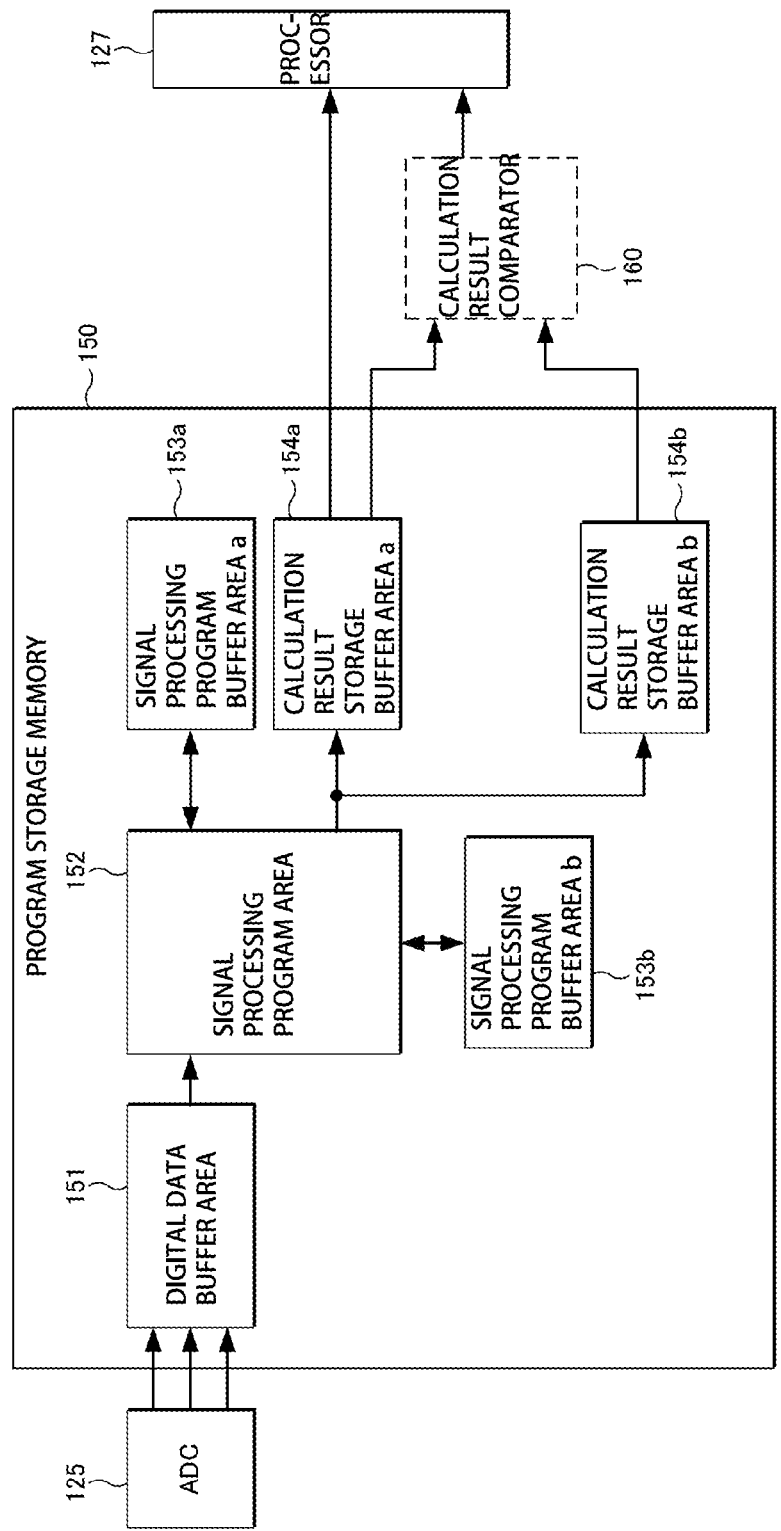
FIG. 7 is a diagram illustrating a second modified example of the embodiment.
Figure 8:
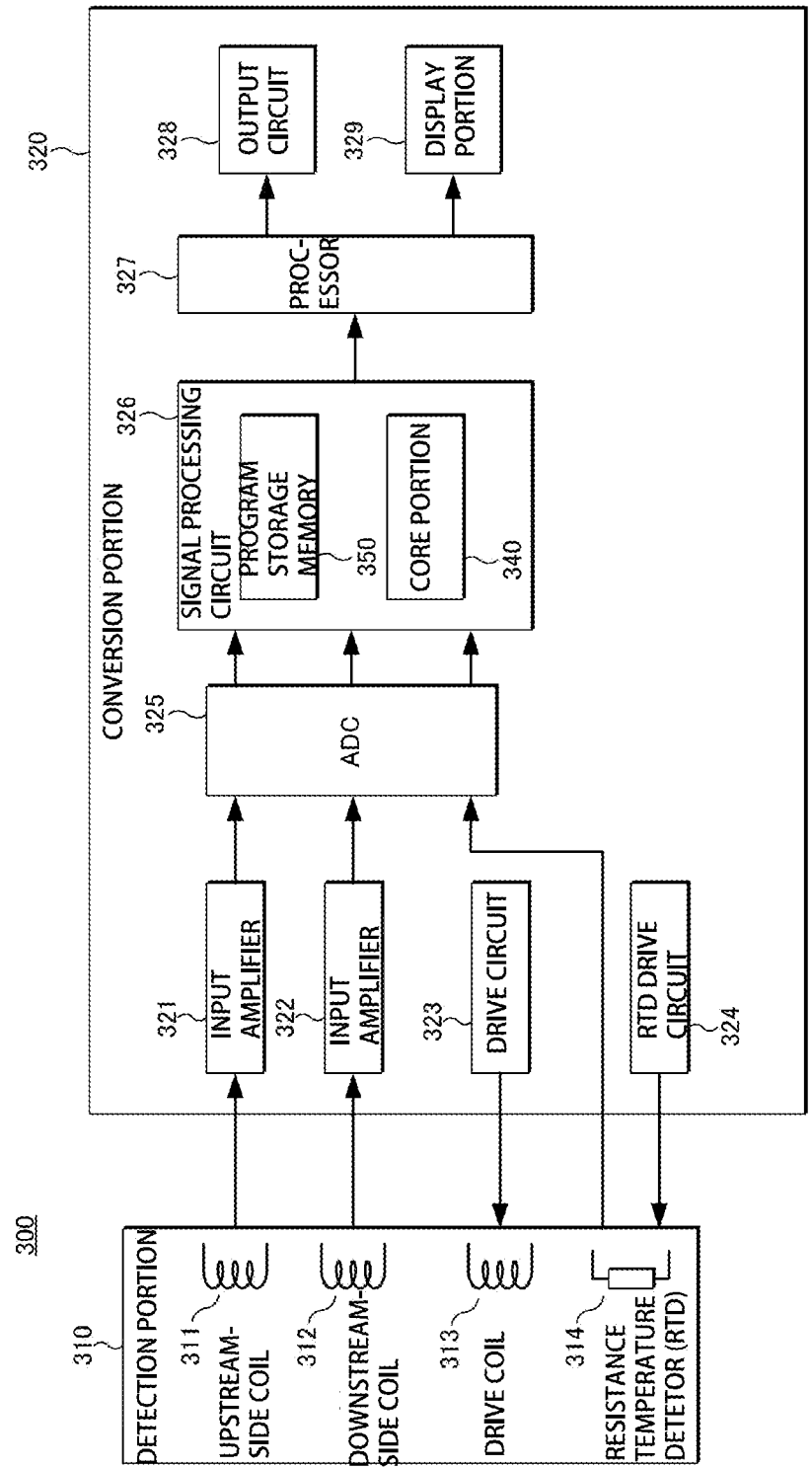
FIG. 8 is a block diagram illustrating the configuration of the related-art Coriolis flowmeter.
Figure 9:
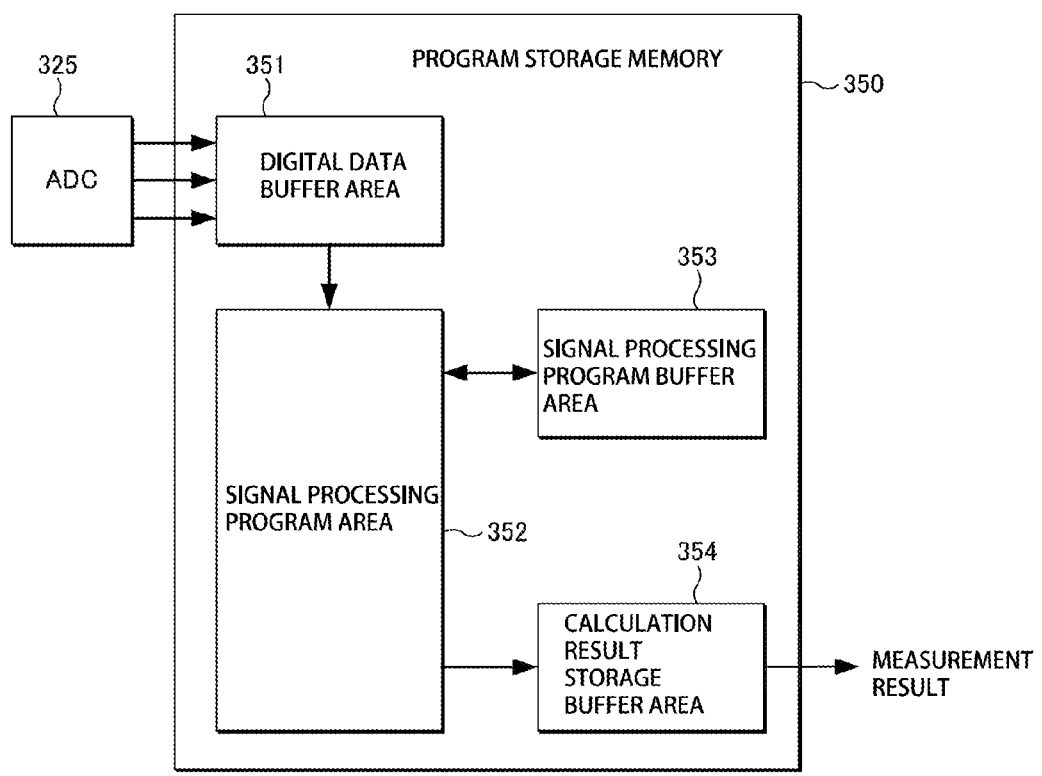
FIG. 9 is a diagram schematically illustrating the storage area formed in the program storage memory.

FIG. 7 is a diagram illustrating a second modified example. As illustrated in this figure, according to the second modified example, the digital data buffer area 151, the signal processing program area 152, the signal processing program buffer area a 153*a*, the signal processing program buffer area b 153*b*, the calculation result storage buffer area a 154*a*, and the calculation result storage buffer area b 154*b* are formed in the program storage memory 150.

That is, a single signal processing program is used. In this case, the signal processing program is adapted to repeatedly perform a same calculation twice using digital data stored in the digital data buffer area 151. A first calculation is performed using the signal processing program buffer area a 153*a*. A calculation result is stored in the calculation result storage buffer area a 154*a*. A second calculation is performed using the signal processing program buffer area b 153*b*. A calculation result is stored in the calculation result storage buffer area b 154*b*.

With this configuration, the calculation result comparator 160 determines whether the calculation result stored in the calculation result storage buffer area a 154*a* matches the calculation result stored in the calculation result storage buffer area b 154*b*. Thus, the soundness of each of the signal processing program buffer area a 153*a*, the signal processing program buffer area b 153*b*, the calculation result storage buffer area a 154*a*, and the calculation result storage buffer area b 154*b* can be checked.

In addition, the configuration of each of the program storage memory 150 according to the above embodiment, the program storage memory 150 according to the first modified example, and the program storage memory 150 according to the second modified example may dynamically be changed.

What is claimed is:

1. A field device comprising:
    a program executor configured to perform a calculation using a detected value;
    a memory comprising
        a data buffer area configured to store data based on the detected value,
        a first program area configured to store a first program causing the program executor to perform a calculation using the data,
        a second program area configured to store a second program causing the program executor to perform a calculation using the data, the second program designed such that if same data is used for the calculation, a result of the calculation performed according to the second program is the same as a result of the calculation performed according to the first program, a first program buffer area configured to store intermediate data when the program executor executes the first program, a second program buffer area configured to store intermediate data when the program executor executes the second program, a first calculation result storage buffer configured to store a result of the calculation performed by the program executor according to the first program, and a second calculation result storage buffer configured to store a result of the calculation performed by the program executor according to the second program; and a calculation result comparator configured to compare the calculation result stored in the first calculation result storage buffer with the calculation result stored in the second calculation result storage buffer by determining whether the calculation result stored in the first calculation result storage buffer matches the calculation result stored in the second calculation result storage buffer, wherein, in response to the calculation result stored in the first calculation result storage buffer matching the calculation result stored in the second calculation result storage buffer, the calculation result comparator determines that a soundness of the memory is maintained.

2. The field device according to claim 1, wherein the calculation of the first program and the calculation of the second program are performed using a same input variable from the data.

3. The field device according to claim 1, wherein the calculation of the first program and the calculation of the second program output at least one of a phase difference, a frequency of vibration, and a resistance value.

4. The field device according to claim 1, wherein the calculation of the first program and the calculation of the second program use the same inputs from the data with different calculations for same outputs.

5. A field device comprising:

a program executor configured to perform a calculation using a detected value;

a memory comprising a first data buffer area configured to store data based on the detected value, a second data buffer area configured to store the data based on the detected value, a first program area configured to store a first program causing the program executor to perform a calculation using the data stored in the first data buffer area, a second program area configured to store a second program causing the program executor to perform a calculation using the data stored in the second data buffer, the second program designed such that if same data is used for the calculation, a result of the calculation performed according to the second program is the same as a result of the calculation performed according to the first program, a first program buffer area configured to store intermediate data when the program executor executes the first program, a second program buffer area configured to store intermediate data when the program executor executes the second program, a first calculation result storage buffer configured to store a result of the calculation performed by the program executor according to the first program, and a second calculation result storage buffer configured to store a result of the calculation performed by the program executor according to the second program; and a calculation result comparator configured to compare the calculation result stored in the first calculation result storage buffer with the calculation result stored in the second calculation result storage buffer by determining whether the calculation result stored in the first calculation result storage buffer matches the calculation result stored in the second calculation result storage buffer, wherein, in response to the calculation result stored in the first calculation result storage buffer matching the calculation result stored in the second calculation result storage buffer, the calculation result comparator determines that a soundness of the memory is maintained.

6. A field device comprising:

a program executor configured to perform a calculation using a detected value;

a memory comprising a data buffer area configured to store data based on the detected value, a program area configured to store a program causing the program executor to repeatedly perform a calculation twice using the data, a first program buffer area configured to store intermediate data when the program executor executes the program a first time, a second program buffer area configured to store intermediate data when the program executor executes the program a second time, a first calculation result storage buffer configured to store a result of the calculation performed by the program executor the first time according to the program, and a second calculation result storage buffer configured to store a result of the calculation performed by the program executor the second time according to the program; and a calculation result comparator configured to compare the calculation result stored in the first calculation result storage buffer with the calculation result stored in the second calculation result storage buffer by determining whether the calculation result stored in the first calculation result storage buffer matches the calculation result stored in the second calculation result storage buffer, wherein, in response to the calculation result stored in the first calculation result storage buffer matching the calculation result stored in the second calculation result storage buffer, the calculation result comparator determines that a soundness of the memory is maintained.

* * * * *